No. 749,665. PATENTED JAN. 12, 1904.
J. M. DIETERLE.
ICE PICK.
APPLICATION FILED FEB. 16, 1903.
NO MODEL.
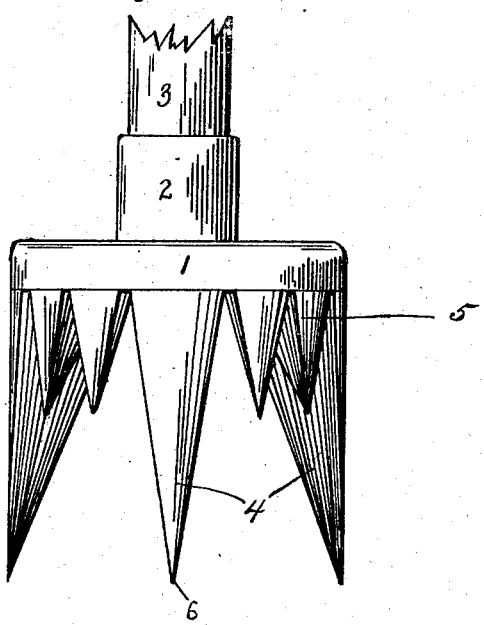
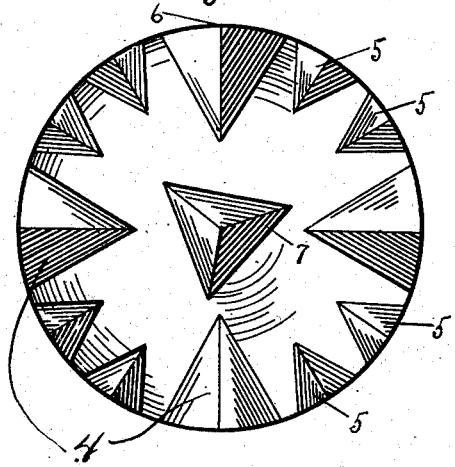
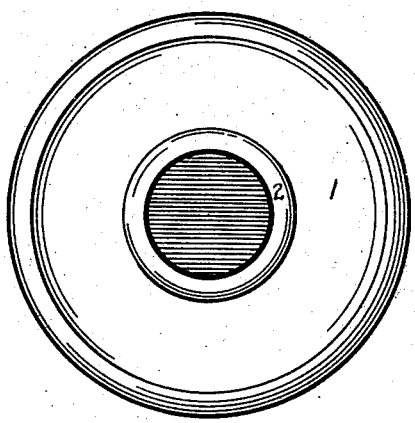
WITNESSES:
INVENTOR:
John M. Dieterle,
BY Hugh K. Wagner
His ATTORNEY No. 749,665. Patented January 12, 1904.

UNITED STATES PATENT OFFICE.

JOHN M. DIETERLE, OF ST. LOUIS, MISSOURI.

ICE-PICK.

SPECIFICATION forming part of Letters Patent No. 749,665, dated January 12, 1904.

Application filed February 16, 1903. Serial No. 143,524. (No model.)

*To all whom it may concern:*

Be it known that I, JOHN M. DIETERLE, a citizen of the United States, residing at the city of St. Louis and State of Missouri, have invented certain new and useful Improvements in Ice-Picks, of which the following is a specification.

This invention consists of an improved form of ice-pick, the object being thoroughly to break up the ice and at the same time to prevent particles thereof from scattering about.

In the drawings, Figure 1 is a side elevational view of my improved ice-pick. Fig. 2 is a bottom plan view of the same, and Fig. 3 is a top plan view thereof.

The ice-pick proper consists of a head 1, having a collar 2 projecting thereabove and formed integrally therewith, said collar forming a socket in which the handle 3 fits. The head 1 has projecting downwardly therefrom a plurality of sharp points, preferably triangular in cross-section and tapering from the head to a point. These prongs are of two kinds, there being a plurality of prongs 4, which are more than twice as long as the prongs 5, of which there is also a plurality. The long prongs 4 are arranged with some of them adjacent to the periphery of the head 1, as clearly seen in Fig. 2, the points thereof being numbered 6, while one of said long prongs 4 is placed adjacent to the center of the bottom portion of the head 1. The short prongs 5 are located adjacent to the periphery of the head 1 and in between the several long prongs 4 and form not only additional points for breaking the ice, but also serve as a guard to keep the particles of ice which are fractured by the longer prongs from being scattered out from the center of the instrument.

It will be readily understood that when the ice-pick is used the longer prongs 4 will make first contact with the ice and break it, and particles will naturally fly upward from the ice as the result of such contact.

7 indicates a central prong of approximately triangular contour in cross-section. By the arrangement and construction of this prong it will be obvious that when the prongs 5 and the said prong 7 simultaneously strike the ice the particles of ice broken by the force of the impact will be thrown against the inclined sides or faces of the various prongs, the central prong forcing the particles of ice outward and into engagement with the prongs 5 and the prongs 5 in turn acting in a reverse manner. When the particles of ice fly up as the result of this impact, they are caught by the hedge or row of prongs of both sizes surrounding the periphery of the head 1.

It will be obvious that while I have shown four long prongs adjacent to the periphery of the head 1, with two short ones in between each pair and one central long prong, yet that the particular number, form, and arrangement of these several prongs may be varied without departing from the spirit of my invention.

There are many other obvious changes of an immaterial character which might be introduced into this device, and Therefore what I claim, and desire to secure by Letters Patent, is—

1. An ice-pick comprising a head, a set of long prongs secured to the lower face thereof, having their outer faces lying flush with the edges of said head and perpendicular to its lower face, and a set of short prongs secured in like manner to said lower face intermediate said long prongs.

2. An ice-pick comprising a head, a set of long prongs secured to the lower face thereof, having their outer faces lying parallel with the edges of said head, a set of short prongs secured to the said lower face intermediate said long prongs, all of said prongs having their inner faces inclined in opposing planes and a central prong, having tapering sides.

In testimony whereof I have affixed my signature, in presence of two witnesses, this 14th day of February, 1903.

JOHN M. DIETERLE.

Witnesses:
ADELAIDE HENSING,
MAUD LETCHER.